United States Patent [19]

Baydatch

[11] Patent Number: 5,801,978
[45] Date of Patent: Sep. 1, 1998

[54] OVERFLOW DETECTION FOR INTEGER-MULTIPLY INSTRUCTION

[75] Inventor: Yair Baydatch, Ramat Hasharon, Israel

[73] Assignee: National Semiconductor Corporation, Santa Clara, Calif.

[21] Appl. No.: 606,650

[22] Filed: Feb. 26, 1996

Related U.S. Application Data

[63] Continuation-in-part of Ser. No. 310,473, Sep. 22, 1994, abandoned.
[51] Int. Cl.[6] ........................... G06F 7/38
[52] U.S. Cl. ........................... 364/745.04
[58] Field of Search ........................... 364/715.04, 745, 364/754, 757, 758, 759, 760, 736.5

[56] References Cited

U.S. PATENT DOCUMENTS

| | | | |
|---|---|---|---|
| 4,575,812 | 3/1986 | Kloker et al. | 364/760 |
| 4,941,119 | 7/1990 | Moline | 364/745 |
| 5,138,570 | 8/1992 | Argade | 364/760 |
| 5,422,805 | 6/1995 | McIntyre et al. | 364/757 |

*Primary Examiner*—Chuong D. Ngo
*Attorney, Agent, or Firm*—Limbach & Limbach L.L.P.

[57] ABSTRACT

An arithmetic logic unit includes overflow trap logic for an integer-multiply instruction. A multiply unit multiplies a pair of n-bit operands together and produces a n+1 bit result. The low order n-bits are returned as the multiplication result. A first overflow logic unit examines the leading bits of both operands and counts the number of leading bits which are equal to respective sign bits. If the count is smaller than n, an overflow trap is signalled. If not, then a second logic unit examines bits n and n−1 of the result and signals an overflow trap if these bits are not equal.

8 Claims, 4 Drawing Sheets

OVERFLOW DETECTION FOR INTEGER-MULTIPLY INSTRUCTION

RELATED APPLICATION

This application is a continuation-in-part of Ser. No. 08/310,473, filed Sep. 22, 1994, now abandoned.

BACKGROUND OF INVENTION

The present invention relates generally to a central processor unit ("CPU") that supports an integer-multiply instruction and determines an overflow trap without reference to the high order bits of the intermediate result.

Microprocessors typically include arithmetic logic units ("ALU") for performing common arithmetic functions. These functions are available to the programmer through a software instruction. One such function is "integer-multiply."

A typical integer-multiply instruction causes two n-bit operands to be multiplied, thereby producing a 2n-bit intermediate result, where n commonly equals 8, 16, or 32. The low order bits of the intermediate result are returned as the multiplication result, while the high order bits are used for calculating the overflow trap of the instruction, which is signaled if the result of the multiplication is too big to be represented using an n-bit number.

CPU's which support integer-multiply instructions are well known. For example, National Semiconductor's 32000 series of microprocessors provide the MULi instruction, which causes the CPU to signal an overflow trap when the result of the MULi operation cannot be represented using an n-bit result. As shown in FIG. 1, the MULi instruction calculates the overflow trap by multiplying n-bit operand A (stored in register 10) together with n-bit operand B (stored in register 12) in multiply unit 14. A 2n-bit intermediate result C is produced by the multiplication and stored in register 16. The low order n bits of the intermediate result register 16 are the multiplication result D and are stored in register 18. The high order n+1 bits of the intermediate result register 16 are then examined by overflow logic unit 20 to determine whether an overflow occurred according to one of two known methods.

First, if the sign-bit of the result register 18 is 0 (indicating a positive signed result), then the n high order bits of the intermediate result register 16 are logically combined in an OR gate (not shown). If the sign-bit of the result register 18 is 1 (indicating a negative result), then the n high order bits of the intermediate result register 16 are logically combined together in an AND gate (not shown). If the result of the selected operation above is 1, i.e., at least one of the high order bits is not equal to the sign bit, then an overflow condition is signaled.

Second, the n high order bits of the intermediate result register 16 are added with the value 0 using an arithmetic logic unit ("ALU") of the CPU. The sign bit is used as a carry-in bit for the ALU. If the result of the ALU operation is not 0, i.e., at least one of the high order bits is not equal to the sign-bit, which is indicated by a zero-flag of the ALU, then an overflow is signaled.

It would be desirable if the overflow trap of the integer-multiply instruction could be performed without reference to the high order n-bits of the intermediate result, and the present invention provides a method for doing so.

SUMMARY OF THE INVENTION

The present invention signals an overflow trap for an integer-multiply instruction without reference to the high order n bits of the intermediate result. Instead, the multiply unit multiplies 2n-bit operands and produces a n+1 bit result. The low order n-bits are returned as the multiplication result. A first overflow logic unit examines the leading bits of both operands and counts the number of leading bits which are equal to the respective sign bits. If the count is smaller than n, an overflow trap is signalled.

If not, then a second logic unit examines bits n and n−1 of the intermediate result and signals an overflow trap if these bits are not equal.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

The present invention provides a method and apparatus for calculating the overflow for an integer-multiply instruction performed in a CPU. Implementation of the method requires little additional hardware and does not reduce the performance of the CPU. The CPU should be capable of manipulating integer data operands of 8, 16, and 32 bits, and floating-point operands of 32 and 64 bits. Many such CPU's are known, such as National Semiconductor's 32000 series of microprocessors. The CPU must support various arithmetic and logic operations, including multiply operations. CPU's typically support two types of multiply operations, namely a floating-point multiply operation and an integer-multiply operation. National's 32000 series of microprocessors implement these operations with the mnemonic instructions MULf and MULi, respectively.

Figure 1:
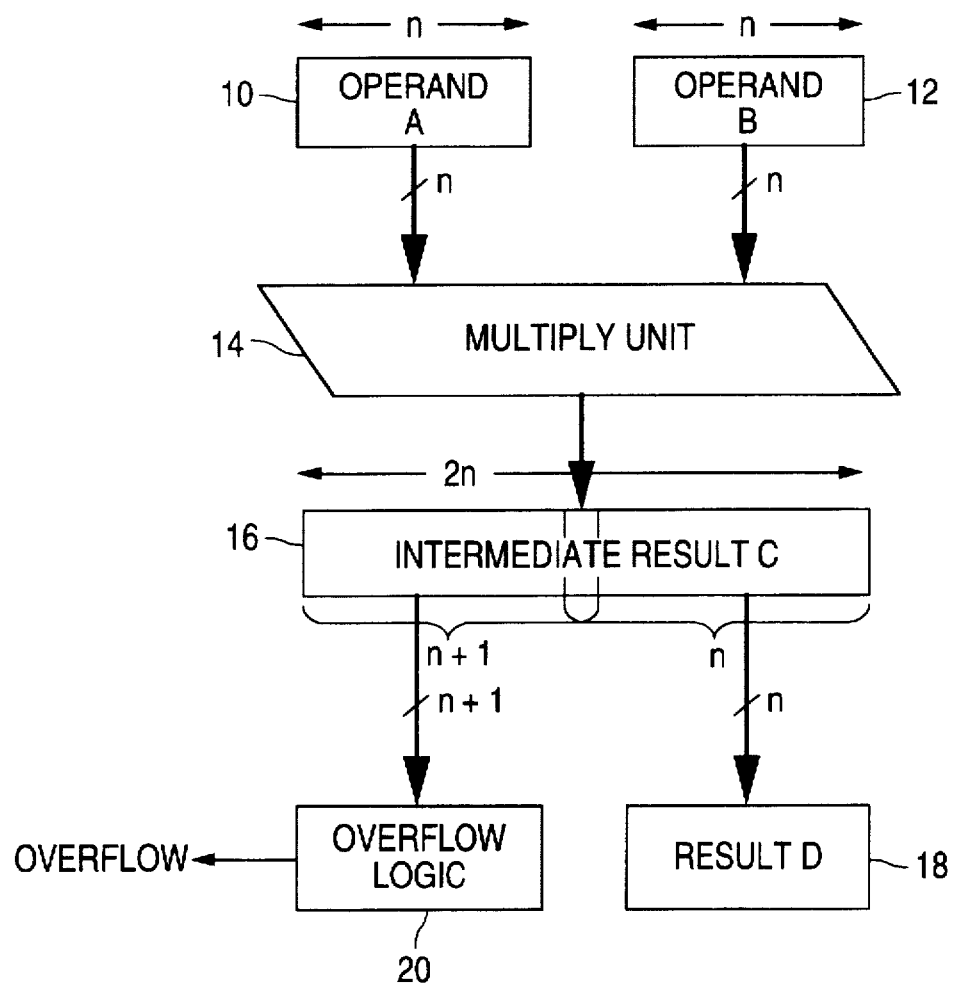
FIG. 1 illustrates the basic block diagram for conventional overflow calculation logic for the MULi instruction.
Figure 2:
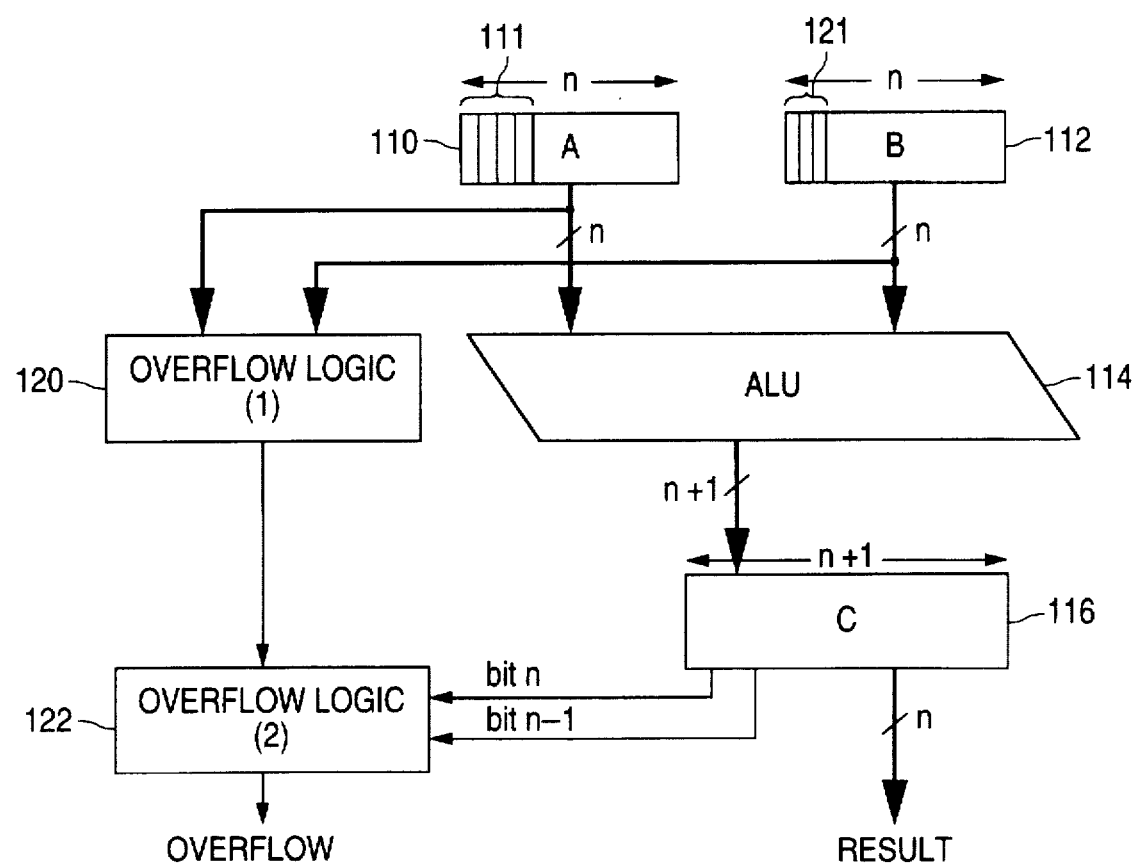
FIG. 2 illustrates the basic block diagram for overflow calculation logic for the MULi instruction according to the present invention.

Referring now to FIG. 2, the CPU (not shown) includes an arithmetic logic unit (ALU) 114 which performs both types of multiply operations. The ALU 114 is typically capable of very high performance, e.g., 50 MHz clock cycles, such that a MULf instruction can be initiated once every two clock cycles, and a MULi instruction can be initiated once every clock cycle if overflow signaling is disabled and once every two clock cycles if overflow signaling is enabled.

According to the present invention, the CPU responds to the MULi instruction by latching the two n-bit operands A and B, stored in n-bit registers 110 and 112, respectively, into the ALU 114 and then multiplying the operands together to produce an n+1 bit result C which is stored in register 116.

In parallel with the multiply operation of ALU 114, a first overflow logic unit 120 counts the total number of "leading sign bits" in registers 111 and 121. The phrase "leading sign bits" is defined to include the sign bit and successive bits of each operand which are equal to the sign bit. For example, if Operand A is the 4 bit signed value −4 (1100), then the number of leading sign bits associated with Operand A is two. If Operand B is the 4 bit signed value −3 (1011), then the number of leading sign bits associated with Operand B is one. Therefore, the total number of leading sign bits for these operands is three, meaning that in accord with the present invention, an overflow will be indicated.

Overflow will occur where the total count of leading sign bits is less than n. Otherwise, more information is required to determine whether an overflow will occur or not, as follows.

If the overflow logic unit 120 has determined that an overflow will occur during the first cycle, then an overflow trap is signaled. If the overflow logic unit 120 could not determine whether an overflow would occur during the first cycle, then, during a second CPU cycle, bits n and n−1 of the intermediate result register 116 are examined by a second overflow logic unit 122. If bits n and n−1 of the intermediate result register 116 are not equal, then an overflow trap is signaled. If not, then the multiplication result can be represented using a n-bit signed number and the overflow trap need not be signaled.

Figure 3:
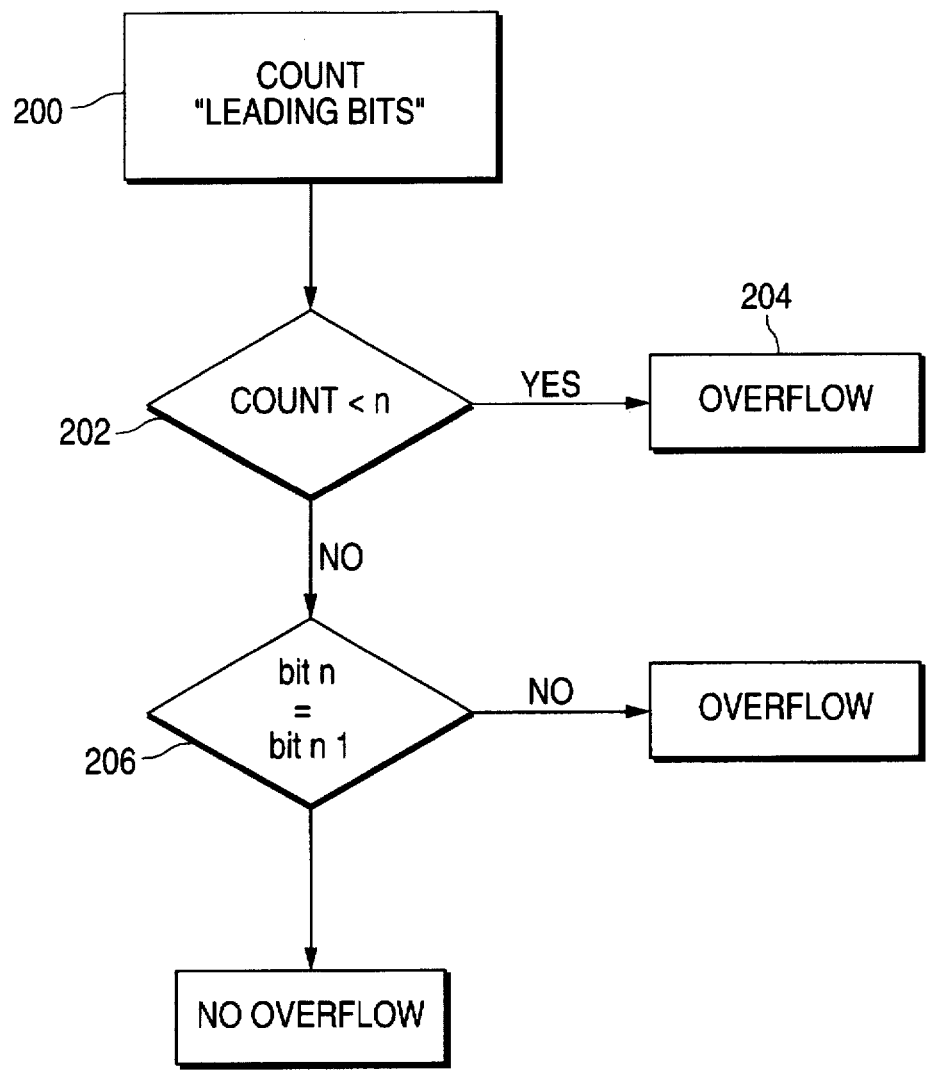
FIG. 3 is a flow chart illustrating the method for overflow calculation according to the present invention.

A simple flow chart of the present method is illustrated in FIG. 3. In step 200, the total count of "leading sign bits" is determined. In step 202, the count is compared to n, which is the number of bits in each operand. If the count of leading sign bits is less than n, then an overflow is indicated in step 204. If not, then bits n and n−1 of the multiplication result are compared to each other in step 206. If bits n and n−1 are not equal, then an overflow is indicated in step 208.

According to the present method, a CPU can implement an integer-multiply instruction supporting overflow trap signaling with a minimum of additional hardware and without impacting the performance.

Figure 4:
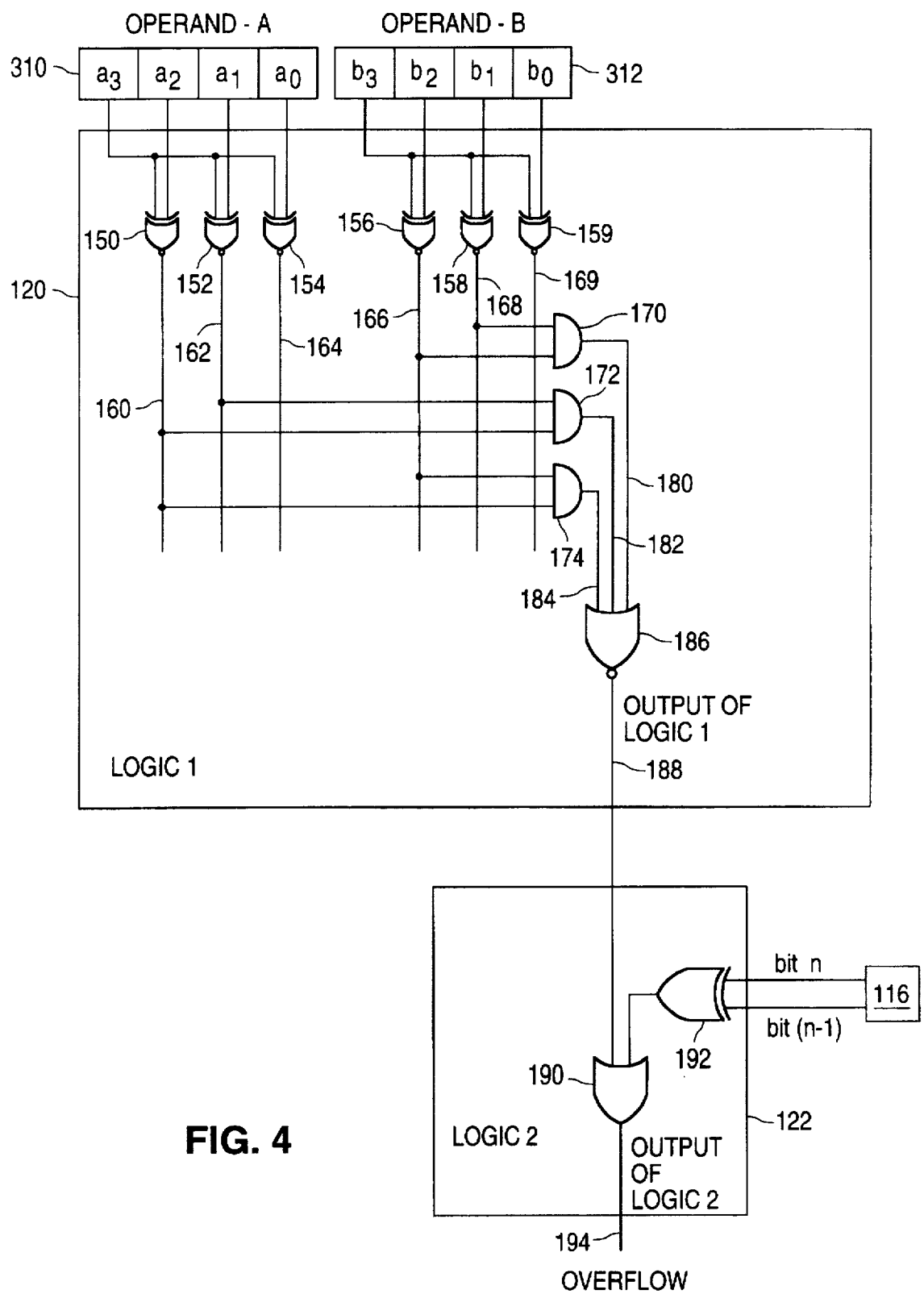
FIG. 4 illustrates a specific embodiment of the overflow logic blocks shown in FIG. 2.

For example, a 4 bit implementation for the first overflow logic unit 120 and the second overflow logic unit 122 is shown in FIG. 4. It should of course be recognized that the example could be extended to any number of bits.

A 4 bit value $a_3a_2a_1a_0$ is loaded into register 310, wherein bit $a_3$ is the most significant bit and the sign bit. A 4 bit value $b_3b_2b_1b_0$ is loaded into register 312, wherein bit $b_3$ is the most significant bit and the sign bit. In the preferred embodiment described herein, the value $a_3a_2a_1a_0$ in register 310 is the two's complement value of Operand A, and the value $b_3b_2b_1b_0$ in register 312 is the two's complement value of Operand B.

The first overflow logic unit 120 includes an $\overline{XOR}$ gate for each bit (other than the MSB) to compare each bit to the MSB. Each of the $\overline{XOR}$ gates 150, 152 and 154 has one of its inputs coupled to the most significant bit $a_3$ of register 310. $\overline{XOR}$ gate 150 has its second input coupled to the next successive bit $a_2$. $\overline{XOR}$ gate 152 has its second input coupled to the next successive bit $a_1$. $\overline{XOR}$ gate 154 has its second input coupled to the next successive (least significant) bit $a_0$ (although this gate is unnecessary to implement the invention). Likewise, each of $\overline{XOR}$ gates 156, 158 and 159 has one of its inputs coupled to the most significant bit $b_3$ of register 112. $\overline{XOR}$ gate 156 has its second input coupled to the next successive bit $b_2$. $\overline{XOR}$ gate 158 has its second input coupled to the next successive bit $b_1$. $\overline{XOR}$ gate 159 has its second input coupled to the next successive (least significant) bit $b_0$ (although this gate is unnecessary to implement the invention).

The outputs 160, 162, 164, 166, 168, 169 of $\overline{XOR}$ gates 150, 152, 154, 156, 158 and 159, respectively, are coupled to AND gates 170, 172 and 174, as follows. Outputs 160 and 162 are coupled to the input of AND gate 172. Outputs 160 and 166 are coupled to the input of AND gate 174. Outputs 166 and 168 are coupled to the input of AND gate 170.

The outputs 180, 182 and 184 from AND gates 170, 172 and 174, respectively, are coupled to inputs of a NOR gate 186. The output 188 of NOR gate 186 is coupled to one input of an OR gate 190.

The other input to OR gate 190 is from an XOR gate 192, which has two inputs coupled to bits n and n−1 of the intermediate result register 116.

The output 188 of NOR gate 186 is the output of the first overflow logic unit 120 and will be true if the total number of "leading sign bits" is less than four, indicating that an overflow condition exists. In that event, the output 194 of OR gate 190 will also be true.

If the total number of "leading sign bits" is greater than or equal to four, then output 188 will be false. In that event, an overflow will only be indicated if bit n and bit n−1 are not the same.

It should be understood that the invention is not intended to be limited by the specifics of the above-described embodiment, but rather defined by the accompanying claims.

I claim:

1. An arithmetic logic unit, comprising:

a first register having n bits, a second register having n bits, a third register having n+1 bits, means for loading a first value into the first register, for loading a second value into the second register, for multiplying the first and second values together, and for storing a result of the multiply operation into the third register, first means for comparing a leading bit of each register to successive bits of the register and for generating a discrete count signal for each comparison so long as the successive bit equals the leading bit, second means for comparing bit n of the third register with bit n−1 of the third register, and means for generating an overflow signal if the number of count signals generated by the first comparing means is less than n or if the comparison by the second comparing means is true.

2. A method utilizable in a microprocessor for determining an overflow condition when two n-bit operands are multiplied together and the result is stored in an n+1 bit result register, wherein a leading bit of each operand is a sign bit, comprising:

for each operand, examining the sign bit and each successive bit for equivalence;

for both operands, counting a number of successive leading bits which are equal to respective sign bits and signalling an overflow if the count is less than n, examining bits n and n−1 of the result register if the count is not smaller than n and signalling an overflow if bits n and n−1 are not equal.

3. An arithmetic logic unit, comprising:

a first register having n bits for storing a first operand, a second register having n bits for storing a second operand, means coupled to the first and second registers for multiplying the first and second operands together thereby obtaining a result, a third register having n+1 bits for storing the result, an overflow indicator;

a first logic unit, comprising means for comparing a sign bit of each operand to successive leading bits of each operand, means for generating a discrete count signal for each comparison so long as the successive leading bit equals the respective sign bit, and means for comparing the number of count signals to n, wherein if the number of count signals is less than n, then the overflow indicator is activated; and a second logic unit, comprising means for comparing bits n and n−1 of the third register, wherein if bits n and n−1 of the third register are not equal, then the overflow indicator is activated.

4. An arithmetic logic unit as in claim 3, wherein the first logic unit comprises:

a first plurality of two input comparators each having one input coupled to bit n of the first operand and the second input coupled in sequence to successive bits of the first operand;

a second plurality of two input comparators each having one input coupled to bit n of the second operand and the second input coupled in sequence to successive bits of the second operand;

means coupled to the first and second plurality of comparators, wherein as long as each comparator generates a true result, a count signal is is generated.

5. An arithmetic logic unit as in claim 3, wherein the second logic unit comprises a comparator coupled to bits n and n−1 of the third register.

6. An arithmetic logic unit as in claim 4, wherein each comparator is an exclusive OR gate.

7. An arithmetic logic unit as in claim 5, wherein the comparator is an exclusive OR gate.

8. An arithmetic logic unit, comprising:

a first register having n bits for storing a first operand, a second register having n bits for storing a second operand, a third register having n+1 bits for storing a result of multiplying together the first operand and the second operand, a first plurality of exclusive NOR gates each having two inputs and an output, wherein for each gate, one of the inputs is coupled to bit n of the first operand and the other input is coupled to a successive bit of the first operand, a second plurality of exclusive NOR gates each having two inputs and an output, wherein for each exclusive NOR gate, one of the inputs is coupled to bit n of the second operand and the other input is coupled to a successive bit of the second operand, a plurality of AND gates each having two inputs and one output, wherein each input is coupled to an output from a unique one of the exclusive NOR gates, a NOR gate having a plurality of inputs and an output, each input being coupled to a respective output of said AND gates, an exclusive OR gate having two inputs and an output, one of said inputs being coupled to bit n of the third register and the other of said inputs being coupled to bit n−1 of the third register, and an OR gate having two inputs and an output, one of said inputs being coupled to the output of the NOR gate and the other of said inputs being coupled to the output of the exclusive OR gate.

* * * * *